(12) United States Patent
Soukeras

(10) Patent No.: US 6,305,357 B1
(45) Date of Patent: Oct. 23, 2001

(54) UNIVERSAL SURROGATE FUEL PUMP SYSTEM

(76) Inventor: Spiro Soukeras, 1350 Pennsylvania St., Des Plaines, IL (US) 60018

( * ) Notice: Subject to any disclaimer, the term of this patent is extended or adjusted under 35 U.S.C. 154(b) by 0 days.

(21) Appl. No.: 09/528,904

(22) Filed: Mar. 20, 2000

(51) Int. Cl.$^7$ .................................................. F02M 33/04
(52) U.S. Cl. ........................ 123/495; 123/198 A; 73/116
(58) Field of Search .................... 123/509, 510, 123/495, 497, 198 A; 73/116, 118.1, 119 A

(56) References Cited

U.S. PATENT DOCUMENTS

| | | |
|---|---|---|
| 2,417,215 | 3/1947 | Satterlee . |
| 3,132,685 | 5/1964 | McKinnon . |
| 3,189,014 | 6/1965 | Kus . |
| 3,845,841 | 11/1974 | Kloefkorn . |
| 4,602,599 | 7/1986 | Glagola . |
| 4,606,311 * | 8/1986 | Reyes et al. ..................... 123/198 A |
| 4,671,230 * | 6/1987 | Turnipseed ....................... 123/198 A |
| 4,747,377 | 5/1988 | Schaller . |
| 4,747,429 | 5/1988 | Sundstrom, Jr. . |
| 4,784,170 * | 11/1988 | Romanelli et al. .............. 123/198 A |
| 4,874,013 | 10/1989 | Hack, Jr. . |
| 5,386,721 * | 2/1995 | Alvizar ................................... 73/116 |
| 5,452,696 * | 9/1995 | Flynn ................................ 123/198 A |
| 5,503,683 * | 4/1996 | Butcher et al. .................. 123/198 A |
| 6,158,975 * | 12/2000 | Dill et al. ............................. 123/509 |

* cited by examiner

*Primary Examiner*—Thomas N. Moulis
(74) *Attorney, Agent, or Firm*—Michael R. McKenna

(57) ABSTRACT

A universal surrogate fuel pump for interim fuel delivery at a number of predetermined discharge pressures to meet many vehicle specifications. It may be used to start and run many different engines. It supplies the fuel without disrupting the normal fuel supply system.

6 Claims, 3 Drawing Sheets

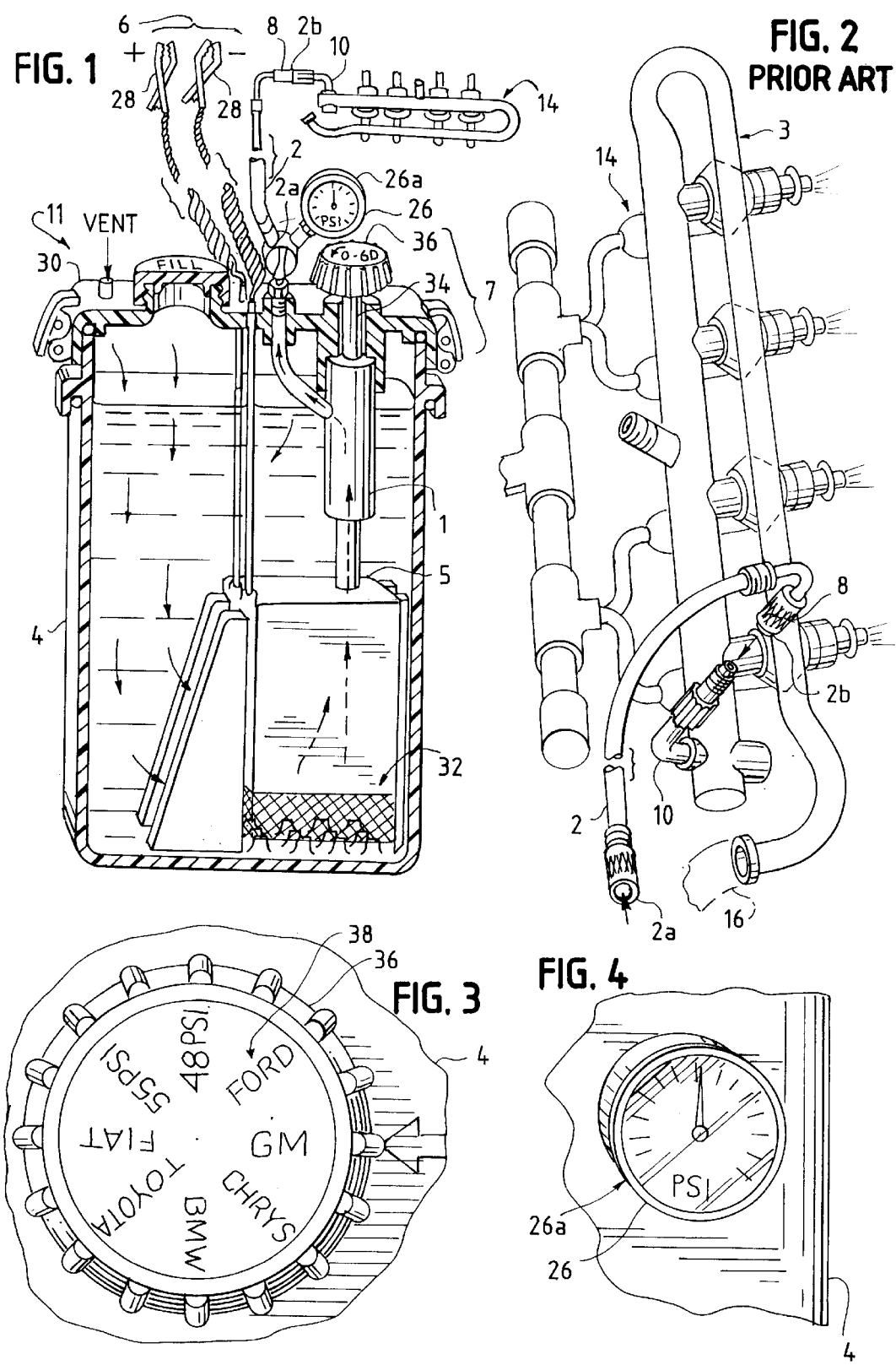

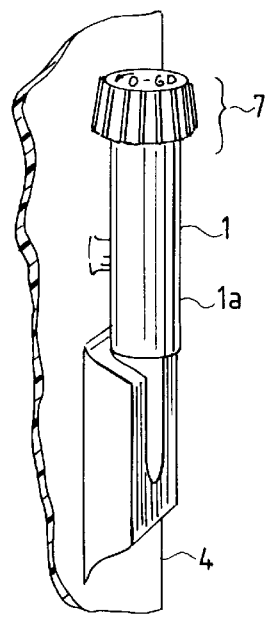
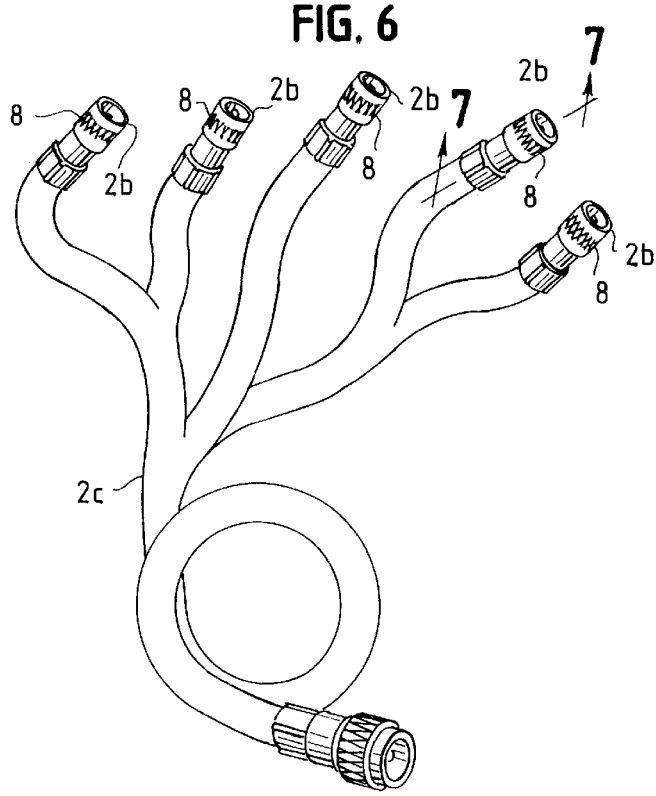
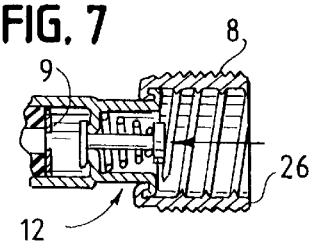
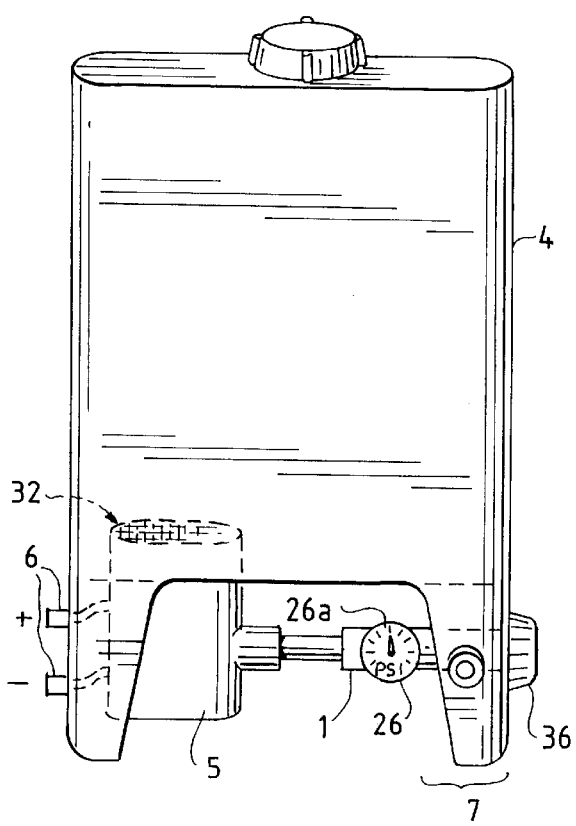
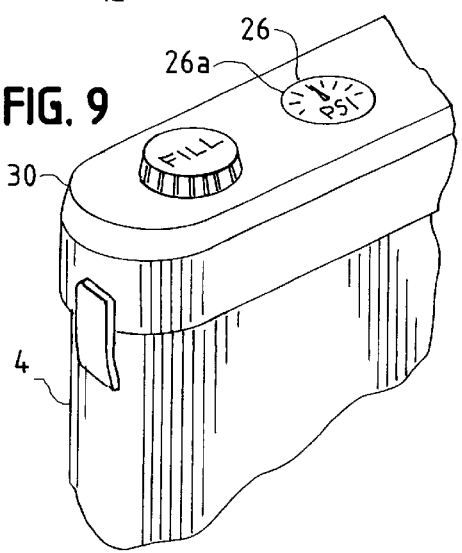

UNIVERSAL SURROGATE FUEL PUMP SYSTEM

BACKGROUND OF THE INVENTION

The present invention is directed to a portable auxiliary fuel system which may be used to service many different engines at one of a variety of fuel supply pressures selected to meet the vehicle's specifications. An embodiment of the system comprises a portable fuel container, a fuel pump operably connected to receive fuel from the portable fuel container, and a selectably adjustable outlet fuel pressure regulator operably connected to receive fuel from the fuel pump.

This superior alternate fuel pump system can be employed to deliver fuel at one of a plurality of predetermined discharge pressures to the fuel system of an internal combustion engine of any one of a plurality of vehicles satisfying a distinct fuel pressure requirement of one of said plurality of vehicles. And, it is preferably designed to supply the interim supply of fuel without disrupting the normal fuel supply system.

The apparatus of the present invention is portable and moveable about the service facility, and can be put on a mobile truck and taken out by a service technician to the field where a vehicle with a disabled fuel pump is located.

Automobile fuel pumps fail, and all too often they fail outside of a repair service center. Without the present invention, when this occurs the service technician generally has the automobile towed to the repair service center, where the fuel pump can be efficiently replaced.

The instant invention provides an advantageous alternative to the foregoing scenario by allowing the service technician to bring with him the universal surrogate fuel pump system which can be reversibly attached to the vehicle's fuel pressure fitting at a pressure selected to meet the vehicle's unique specification for the fuel injectors to allow the internal combustion engine to be started with an interim fuel delivery. Once the engine is started, the portable fuel pump will provide continuing fuel to the engine so that the vehicle may be driven to the service center for replacement of the permanent fuel pump.

A number of means for adjusting the outlet fuel pressure for generating a plurality of specific discharge pressures of the universal surrogate fuel pump system are provided including a selectably adjustable outlet fuel pressure regulator operably connected to receive fuel from the fuel pump, a fuel pump having a variable head discharge capability which is suitable programed, a manually adjustable outlet fuel pressure regulator operably connected to receive fuel from the fuel pump and means for determining the outlet fuel pressure, and an outlet fuel line having an inlet end operably connected to the fuel pump and a plurality of outlet ends, each of which has a distinctive flow restrictor effecting a distinct outlet pressure.

The selectable pressure fuel pump system of the present invention is powered by a temporary connection to the vehicle's battery, an external battery or other suitable power supply.

These together with other objects of the invention, along with the various features of novelty which characterize the invention are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

Still other advantages will be apparent from the disclosure that follows.

SUMMARY OF THE INVENTION

The invention relates to a universal surrogate fuel pump system for interim fuel delivery at a predetermined pressure to a fuel system of an internal combustion engine of any one of a plurality of vehicles satisfying a distinct fuel pressure requirement of one of said plurality of vehicles. An embodiment of the system comprises a portable fuel container, a fuel pump operably connected to receive fuel from the portable fuel container, and a fuel pressure regulator operably connected to receive fuel from the fuel pump.

The fuel pump is electrically powered and has means for receiving electrical power, and the regulator, either independently or in conjunction with a unique outlet fuel line, selectably adjusts the outlet fuel pressure.

This superior alternate fuel pump system can be employed to deliver fuel at one of the plurality of predetermined discharge pressures to the fuel system of an internal combustion satisfying a distinct fuel pressure requirement of one of a plurality of vehicles.

This fluid delivery apparatus can be employed to deliver fluid, such as fuel or a fuel injector cleaner or the like, to any of a plurality of vehicles having distinct fuel pressure requirements at one of the plurality of predetermined pressures. The apparatus can be employed to clean a system of fuel injectors of the engine and/or to start any of a plurality of vehicles having a failed permanently installed fuel pump at one of the plurality of predetermined pressures.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Preferred embodiments of the invention are described hereinafter with reference to the accompanying drawing wherein:

FIG. 1 is a side elevation view of the universal surrogate fuel pump system of the present invention with the facing portion of the fuel container cut away to show the internal element;

FIG. 2 is a perspective view of a prior art fuel injection system having a fuel pressure fitting and showing how the outlet fuel line of the instant invention connects with said fuel pressure fitting;

FIG. 3 is a top plan view of the universal surrogate fuel pump system of the present invention showing an adjustment cap for selectively adjusting the outlet fuel pressure of the regulator;

FIG. 4 shows a pressure gauge disposed on the wall of the container of the universal surrogate fuel pump system of the present invention;

FIG. 5 is a perspective fragmentary view of the wall of the fuel container of the universal surrogate fuel pump system showing the pressure regulator disposed outside of the container;

FIG. 6 is a perspective view of a preferred outlet fuel line of the universal surrogate fuel pump system of the present invention showing an inlet end and a plurality of outlet ends;

FIG. 7 is a cut away side elevation view taken along the lines 7—7 of FIG. 6 showing the internal elements of one of the fittings disposed on the outlet end with means for normal closure which is opened by attachment to the fuel system and further showing a restrictor disposed in the flow path;

FIG. 8 is a perspective view of the universal surrogate fuel pump system of the present invention showing the pump and regulator disposed outside of the system container;

FIG. 9 is a fragmentary view of an upper corner of a preferred embodiment of the container of the universal surrogate fuel pump system of the present invention showing a removable cover with a capped opening for fuel filling and a pressure gauge disposed on said cover;

DETAILED DESCRIPTION OF THE INVENTION

Figure 10:
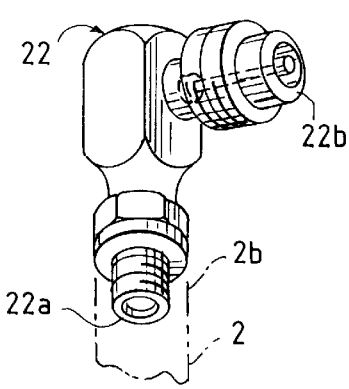
FIG. 10 is a perspective view of a male-to-male fitting for use with the outlet line of the universal surrogate fuel pump of the present invention for connecting to a fuel system of an internal combustion engine.
Figure 11:
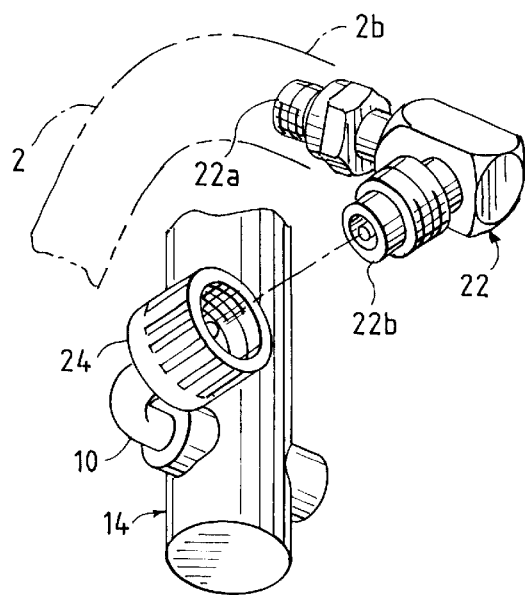
FIG. 11 shows a section of a fragmentary view of a fuel injector header with a female pressure fitting connection into which a male-to-male fitting can be disposed, with the outlet fuel line shown in phantom.
Figure 12:
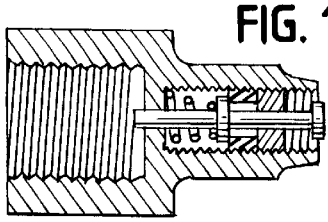
FIG. 12 is a cut away side elevation view showing that the male end of a fitting that is normally closed with a central rod actuator to open said fitting when it is attached to a female member as shown in FIG. 11.

The preferred embodiments depicted in the drawing include a portable apparatus for impermanently delivering fluid to a fuel system of an internal combustion engine at one of a plurality of predetermined pressures. Without departing from the generality of the invention disclosed herein, the fluid delivery apparatus can be employed to clean a system of fuel injectors of the engine and/or to start and run any of a plurality of vehicles having a failed permanently installed fuel pump at one of the plurality of predetermined pressures.

The discussion that follows, without limiting the scope of the invention, will refer to the invention as depicted in the drawing, showing an apparatus that will deliver fluid, such as fuel or a fuel injector cleaner or the like, to any of a plurality of vehicles having distinct fuel pressure requirements at one of the plurality of predetermined pressures.

The variants of preferred embodiments of the invention relate primarily to the means disclosed to provide fuel at a variety of predetermined distinct pressures to meet the independent specifications of each vehicle.

In the preferred embodiments, depicted in the drawings, a selectably adjustable pressure regulator 1 and a unique outlet fuel line 2 capable of delivering fuel at a number of distinct fuel pressures are disclosed. Obviously, those skilled in the art will appreciate that a plurality of individual outlet lines, each capable of delivering fuel at a predetermined distinct pressure could alternatively be employed.

Referring to FIG. 1, a universal surrogate fuel pump system 11 for interim fuel delivery to a fuel system 3 of an internal combustion engine at one of a plurality of predetermined discharge pressures is provided by this important invention. It comprises a portable fuel container 4, a fuel pump 5 operably connected to receive fuel from the portable fuel container, and a selectably adjustable outlet fuel pressure regulator 1 operably connected to receive fuel from the fuel pump 5.

The fuel pump 5 is electrically powered and has means for receiving electrical power 6. The regulator 1 preferably has means for selectably adjusting 7 the outlet fuel pressure. As illustrated in FIGS. 1, 3, 5 and 8, a regulator with an adjustment stem 34 connected to a calibrated knob 36 having predetermined indicia 38 to identify a vehicle and/or pressure for a specific vehicle can be employed. The fuel pump system 11 can thus be employed to deliver fuel at one of the plurality of predetermined discharge pressures to the fuel system 3 of an internal combustion engine of any one of a plurality of vehicles satisfying a distinct fuel pressure requirement of one of said plurality of vehicles.

A preferred embodiment of the universal surrogate fuel pump system 11 of the present invention further comprises an outlet fuel line 2 having an inlet end 2a operably connected to the fuel pressure regulator 1 and an outlet end 2b having a fitting 8 for reversible attachment to the fuel system 3 of the internal combustion engine.

As shown in FIG. 6, another preferred aspect of the universal surrogate fuel pump system 11 of the present invention includes an outlet fuel line 2 having an inlet end 2a operably connected to the fuel pressure regulator 1 and a plurality of outlet ends 2b, with each of the plurality of outlet ends having a fitting 8 for reversible attachment to the fuel system of at least one of a plurality of internal combustion engines, each fitting 8 having a one way valve 12, as best shown in FIG. 7, that is normally closed and which is opened by attachment to the fuel system 3.

Another preferred embodiment of the universal surrogate fuel pump system 11 for interim fuel delivery to a fuel system of an internal combustion engine at one of a plurality of predetermined discharge pressures comprises a portable fuel container 4, a fuel pump 5 operably connected to receive fuel from the portable fuel container, and an outlet fuel line 2 having an inlet end 2a operably connected to the fuel pump and a plurality of outlet ends 2b. The fuel pump is electrically powered and has means for receiving electrical power 6, and each of the plurality of outlet ends has a fitting 8 for reversible attachment to the fuel system of at least one of a plurality of internal combustion engines.

Preferably, each fitting 8 has a distinctive flow restrictor 9 for generating a specific discharge pressure fulfilling a distinct fuel pressure requirement of the at least one of a plurality of internal combustion engines.

Moreover, the fitting 8 for reversible attachment to the fuel system of the internal combustion engine may connect to a fuel pressure fitting 10 of the fuel injection system 14 while leaving in place a permanently connected fuel supply line 16, as shown in FIG. 2.

Figure 13:
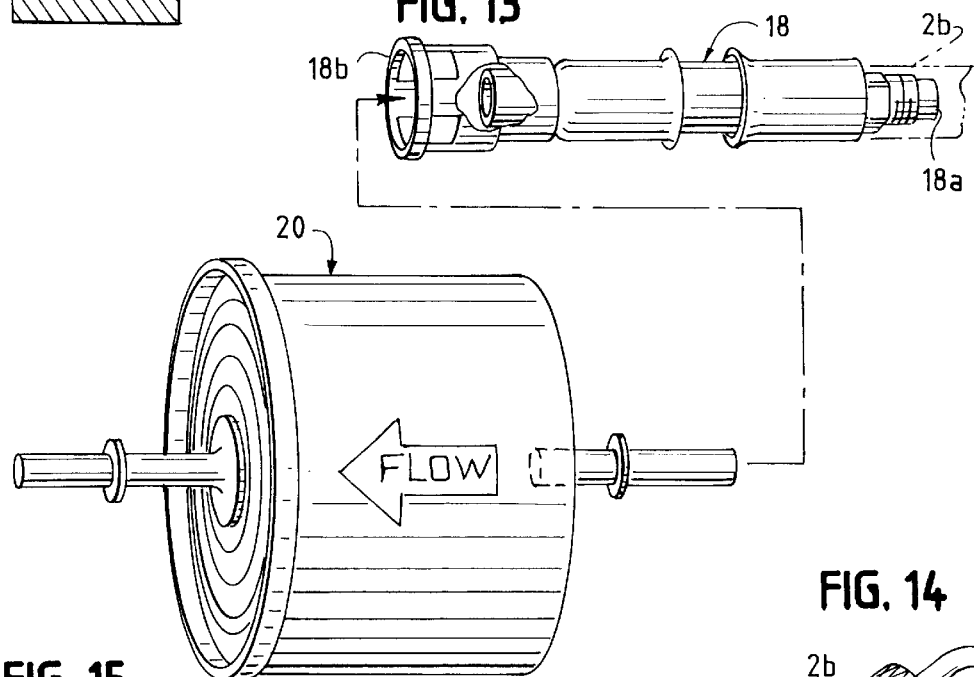
FIG. 13 is an embodiment for attaching the universal surrogate fuel pump to a fuel systems internal combustion engine showing a connector body that may be attached to an inlet end to the outlet fuel line and the discharge end to a fuel filter.

Alternately, referring to FIG. 13, a connector body 18 having a receiving end 18a suitably sized and configured to connect with the outlet end 2b and an emitting end 18b suitably sized and configured to connect with a fuel filter 20 of the fuel system 3 of the internal combustion engine may be employed.

Another preferred aspect of the universal surrogate fuel pump system of the present invention comprises a male to male connector 22 having a receiving end 22a suitably sized and configured to connect with the outlet end 2b and an emitting end 22b suitably sized and configured to connect with a female shaped connector 24 disposed on the fuel system of the internal combustion engine.

In the universal surrogate fuel pump system for interim fuel delivery to an internal combustion engine at one of a plurality of predetermined pressures, the fuel pump 5 may be integrally disposed within the container 4, as shown in FIG. 1. (See alternative in FIG. 8.)

The apparatus comprises a portable fuel container 4, a fuel pump 5 operably connected to receive fuel from the portable fuel container, which is electrically powered and has means for receiving electrical power, a manually adjustable outlet fuel pressure regulator 1 operably connected to receive fuel from the fuel pump with means for determining the outlet fuel pressure 26, and an outlet fuel line 2 having an inlet end 2a operably connected to the fuel pressure regulator 1 and an outlet end 2b having a fitting 8 for reversible attachment to the fuel system of the internal combustion engine. This apparatus can be employed to start any of a plurality of vehicles having a failed permanently installed fuel pump by delivering fuel to meet a distinct fuel pressure requirement at one of the plurality of predetermined pressures.

Referring to FIGS. 1 and 8 of the drawing, the means for receiving electrical power 6 to the fuel pump 5 comprises positive and negative leads extending from the fuel pump. Referring to FIG. 1, the positive lead has clamp 28 or other connecting device on a terminal end for attachment to a battery of the vehicle and the negative lead may have a clamp 28 or other connecting device on a terminal end for attachment to ground.

In a preferred embodiment of the present invention, the fuel pump 5 is integrally disposed within the container. Preferably, the fuel pump is mounted to an interior surface of a wall of the container. The means for receiving electrical power to the fuel pump 5 comprises positive and negative leads extending from the fuel pump and through a wall of the container, and the positive lead has clamp 28 on a terminal end for attachment to a battery of the vehicle and the negative lead has a clamp 28 on a terminal end for attachment to ground. Moreover, this preferred portable fuel delivery apparatus may have a removable lid 30 on the container 4 that is suitably sized for access to the fuel pump 5. Similarly, the regulator 1 may be disposed inside of the container 4, as shown in FIG. 1.

Thus, the container 4 of this important invention may serve a dual purpose of holding a portable supply of fuel, and holding and protecting the fuel pump 5 and the regulator 1.

Referring to FIGS. 1, 4, 8 and 9 of the drawing, preferably the means for determining 26 the outlet fuel pressure of the regulator comprises a pressure gauge that has outlet fuel pressure indicia readably disposed outside of the container 4 and a manually operated discharge valve (which may be integral to a regulator 1). The apparatus of this invention may have preset fuel discharge pressures settings which serve as the means for determining the outlet fuel pressure of the regulator, in which case the need for a pressure gauge is optional. One may nonetheless be desirable and it will have to be readable outside of the container. This may be accomplished by disposing the gauge inside of the container and providing a transparent wall portion through which it may be read, as shown in FIG. 9, or by locating the pressure gauge outside of the container where it can be read. Alternatively, the outlet fuel pressure determining means may be disposed outside of the container measuring pressure of the fuel discharge line 2, as shown in FIG. 1.

Preferably, the universal surrogate fuel pump system for interim fuel delivery to an internal combustion engine at one of a plurality of predetermined pressures of the present invention further comprises a fuel filter 32 in operative association with a fuel intake of the fuel pump 5.

To permit this portable apparatus to start any of a plurality of vehicles by delivering fuel to meet a distinct fuel pressure requirement at one of the plurality of predetermined pressures without disconnecting the failed permanently installed fuel pump, the disclosure provides that the fitting 8 reversibly attach to the fuel system while allowing a failed permanently installed fuel pump to remain operably connected to the fuel system. One way of accomplishing this is by reversibly attaching the fitting to a fuel pressure fitting 10 of a fuel injector assembly 14 of the fuel system.

The universal surrogate fuel pump system 11 for interim fuel delivery to an internal combustion engine at one of a plurality of predetermined pressures of this invention provides that the outlet fuel pressure of the fuel pump 5 is greater than each of the distinct fuel pressure requirement of the plurality of vehicles. In this way, the outlet fuel pressure of the fuel pump can be selectably regulated by the regulator to deliver fuel to the fuel system to meet the distinct fuel pressure requirement of each of the plurality of vehicles.

In a preferred embodiment of the present invention, the means for determining the outlet fuel pressure of the regulator comprises means for selectably adjusting 7 the outlet fuel pressure.

In a preferred embodiment of the present invention, the fitting 8 comprises a plurality quick disconnect couplings. Each of the plurality quick disconnect couplings extends from the outlet end 2b of the outlet fuel line 2 and is suitable sized for reversible attachment to the fuel system of at least one of the plurality of vehicles. Thus, differences in fuel pressure and the size of the fuel system connection to which the coupling connects can be accommodated by the instant invention.

Although not required on the single coupling embodiment shown in FIG. 1, the universal surrogate fuel pump system for interim fuel delivery to an internal combustion engine at one of a plurality of predetermined pressures may comprise a shut off valve 12 integral with is the fitting 8, as shown in FIG. 7, or with each of the plurality of couplings. In operation, a vehicle service technician may connect the fuel delivery apparatus of the present invention to the fuel system 3 to start the vehicle and then drive the vehicle to a service center or other destination using the fuel delivery apparatus of the instant invention as the sole fuel delivery source. Once the vehicle has reached its destination, the fuel delivery apparatus can be disconnected. For fuel pump failures, the need of a tow truck to deliver the vehicle to the service center will no longer be required.

In a preferred embodiment of the present invention, a universal surrogate fuel pump system for interim fuel delivery to a fuel system of an internal combustion engine at one of a plurality of predetermined pressures is disclosed comprising a portable fuel container 4, a fuel pump 5 operably connected to receive fuel from the portable fuel container 4 that is electrically powered and has means for receiving electrical power, and in which the fuel pump is integrally disposed within the container. Furthermore, a manually adjustable outlet fuel pressure regulator 1 operably connected to receive fuel from the fuel pump is provided with means for determining the outlet fuel pressure 26, and an outlet fuel line 2 having an inlet end 2a operably connected to the fuel pressure regulator 1 and an outlet end 2b having a fitting 10 for reversible attachment to the fuel system 3 of the internal combustion engine. The apparatus can be employed to start any of a plurality of vehicles having a failed permanently installed fuel pump by delivering fuel to meet a distinct fuel pressure requirement at one of the plurality of predetermined pressures.

Preferably, the fitting 10 reversibly attaches to the fuel system while allowing a failed permanently installed fuel pump to remain operably connected to the fuel system 3, whereby, the apparatus of this invention can be employed to start any of a plurality of vehicles by delivering fuel to meet a distinct fuel pressure requirement at one of the plurality of predetermined pressures without disconnecting the failed permanently installed fuel pump.

In a preferred embodiment of the portable fuel delivery apparatus, the fitting comprises a plurality quick disconnect couplings, with each of the plurality quick disconnect couplings extending from the outlet end of the outlet fuel line and being suitable sized for reversible attachment to the fuel system of at least one of the plurality of vehicles.

In another preferred embodiment of the present invention, a portable apparatus for impermanently delivering fluid to a fuel system of an internal combustion engine at one of a plurality of predetermined pressures is taught comprising a portable fluid container, a fluid pump operably connected to receive fluid from the portable fluid container, that is electrically powered with means for receiving electrical power, a manually adjustable outlet fluid pressure regulator 1 operably connected to receive fluid from the fluid pump, and an outlet fluid line 2 having an inlet end 2a operably connected to the fluid pressure regulator and an outlet end 2b with a fitting 8 for reversible attachment to the fuel system 3 of the internal combustion engine. This fluid delivery apparatus can be employed to deliver fluid, such as fuel or a fuel injector cleaner or the like, to any of a plurality of vehicles having distinct fuel pressure requirements at one of the plurality of predetermined pressures.

In one preferred use of the portable fluid delivery apparatus, the fluid delivered by the apparatus comprises a cleaning solution. The apparatus can be employed to clean a system of fuel injectors of the engine.

In another preferred embodiment of the present invention, the fluid delivered by the apparatus comprises a fuel, whereby, the fluid delivery apparatus can be employed to start any of a plurality of vehicles having a failed permanently installed fuel pump at one of the plurality of predetermined pressures.

Preferably, the container is sized to accommodate two quarts of fluid and is made from a rigid plastic or other suitable material able to withstand the temperature of the engine compartment of an internal combustion engine driven vehicle. The fluid pump should develop a discharge head of approximately 60 psi and have sufficient capacity to propel the vehicle. The pressure regulator should be compatible with the discharge head of the fuel pump and have selectable preset throttling capabilities to meet the distinct fuel pressure requirement of the plurality of predetermined pressures of the vehicles.

A preferred embodiment of the universal surrogate fuel pump system 11 for interim fuel delivery to a fuel system 3 of an internal combustion engine at one of a plurality of predetermined discharge pressures comprises a portable fuel container 4; a fuel pump 5 operably connected to receive fuel from the portable fuel container; and means for adjusting the outlet fuel pressure for generating a plurality of specific discharge pressures, each of which fulfills a distinct fuel pressure requirement of the at least one of a plurality of internal combustion engines comprising one of a selectably adjustable outlet fuel pressure regulator operably connected to receive fuel from the fuel pump, said fuel pump having a variable head discharge capability which is suitable programed and selectable through a controller, and an outlet fuel line 2 having an inlet end 2a operably connected to the fuel pump and a plurality of outlet ends, each of the plurality of outlet ends 2b having a fitting 8 for reversible attachment to the fuel system 3 of at least one of a plurality of internal combustion engines, each said fitting 8 having a distinctive flow restrictor 9 and a normally closed valve 12 that is opened upon attachment.

Figure 15:
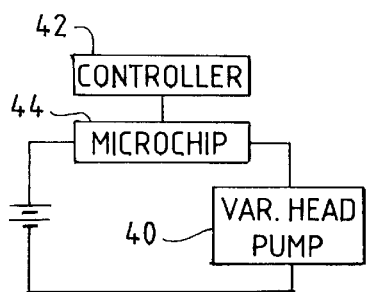
FIG. 15 is a schematic diagram of variable speed fuel pump that has a programed microchip and a controller.
Figure 14:
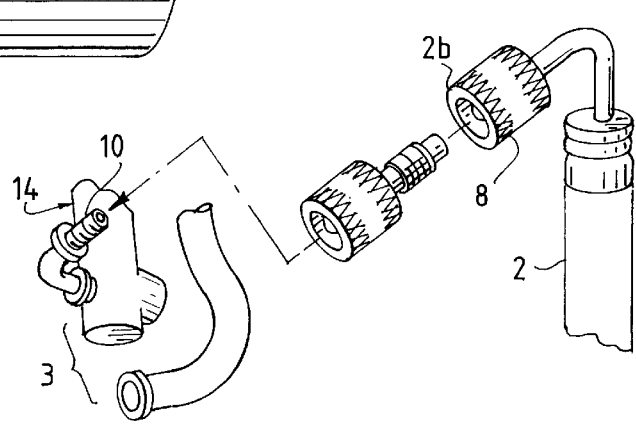
FIG. 14 shows another means of connecting the outlet fuel line of the universal surrogate fuel pump system to the fuel injector header.

The universal surrogate fuel pump system for interim fuel delivery to an internal combustion engine at one of a plurality of predetermined pressures comprises a portable fuel container 4; a variable speed fuel pump 40 operably connected to receive fuel from the portable fuel container and programed to generate one of a plurality of discharge pressures, said fuel pump 40 is electrically powered and having means for receiving electrical power; a controller 42 to select the one of a plurality of discharge pressures; and an outlet fluid line 2 having an inlet end operably connected to the fuel pump and an outlet end having a fitting 8 for reversible attachment to the fuel system of the internal combustion engine, as shown in FIG. 15. In this way, the apparatus can be employed to deliver fuel to any of a plurality of vehicles having distinct fuel pressure requirements at one of the plurality of predetermined pressures.

As shown in FIG. 1 and 3, the selectably adjustable outlet fuel pressure regulator produces a plurality of predetermined outlet pressures that can be selected by rotating a dial 36 having indicia 38 identifying specific predetermined outlet pressures and/or vehicle identifiers, such a the name or model of specific vehicles. From the selection of vehicles and/or pressures identified on the regulator dial, a desired discharge head meeting the distinct requirements of one of a plurality of vehicles can be obtained.

The fuel pump having a variable head discharge capability which is suitable programed can preferably comprise a variable speed pump 40 and a programmed microchip 44 connected to a controller 42 that regulates the electrical supply to achieve the desired discharge heads selection, as shown in FIG. 15.

The manually adjustable outlet fuel pressure regulator 1a can be operably connected to a pressure gauge 26a and a desired discharge heads selection achieved by coordinating the two.

The fuel pump is electrically powered and has means for receiving electrical power.

The fuel pump system can thus be employed to deliver fuel at one of the plurality of predetermined discharge pressures to the fuel system of an internal combustion engine of any one of a plurality of vehicles satisfying a distinct fuel pressure requirement of one of said plurality of vehicles.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims.

Clearly, an anticipated alternative to the foregoing fluid pump and discharge pressure regulator to achieve a plurality of predetermined fluid pressures to meet distinct fuel pressure requirement of different vehicles could be accomplished with a variable discharge head pump properly programed to achieve the plurality of predetermined fluid pressures.

Further, the purpose of the foregoing is to enable the U.S. patent and Trademark Office and the public generally, and especially the scientist, engineers and practitioners in the art who are not familiar with patent or legal terms of phraseology, to determine quickly from a cursory inspection the nature and essence of the technical disclosure of the application.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is a follows:

1. A universal surrogate fuel pump system for interim fuel delivery to an internal combustion engine at one of a plurality of predetermined pressures comprising:
   (1) a portable fuel container;
   (2) a fuel pump operably connected to receive fuel from the portable fuel container,
      said fuel pump being electrically powered and having means for receiving electrical power; and
   (3) a selectably adjustable outlet fuel pressure regulator operably connected to receive fuel from the fuel pump, said regulator having means for selectably adjusting the outlet fuel pressure; and
   (4) an outlet fuel line having an inlet end operably connected to the fuel pressure regulator and a plurality of outlet ends, each of the plurality of outlet end having a fitting for reversible attachment to the fuel system of at least one of a plurality of internal combustion engines, each said fitting having a one way valve that is normally closed and which is opened by attachment to the fuel system, whereby, said fuel pump system can be employed to deliver fuel at one of the plurality of predetermined discharge pressures to the fuel system of an internal combustion engine of any one of a plurality of vehicles satisfying a distinct fuel pressure requirement of one of said plurality of vehicles.

2. A universal surrogate fuel pump system for interim fuel delivery to a fuel system of an internal combustion engine at one of a plurality of predetermined discharge pressures comprising:
   a. a portable fuel container;
   b. a fuel pump operably connected to receive fuel from the portable fuel container,
      said fuel pump being electrically powered and having means for receiving electrical power; and
   c. an outlet fuel line having an inlet end operably connected to the fuel pump and a plurality of outlet ends, each of the plurality of outlet ends having a fitting for reversible attachment to the fuel system of at least one of a plurality of internal combustion engines, each said fitting having a distinctive flow restrictor for generating a specific discharge pressure fulfilling a distinct fuel pressure requirement of the at least one of a plurality of internal combustion engines.

3. The universal surrogate fuel pump system for interim fuel delivery to an internal combustion engine at one of a plurality of predetermined pressures of claim 2, wherein the fitting reversibly attaches to the fuel system while allowing a failed permanently installed fuel pump to remain operably connected to the fuel system,
   whereby, said apparatus can be employed to start any of a plurality of vehicles by delivering fuel to meet a distinct fuel pressure requirement at one of the plurality of predetermined pressures without disconnecting the failed permanently installed fuel pump.

4. The universal surrogate fuel pump system for interim fuel delivery to an internal combustion engine at one of a plurality of predetermined pressures of claim 2, wherein the fitting comprises a plurality quick disconnect couplings, each of said plurality quick disconnect couplings extending from the outlet end of the outlet fuel line and being suitable sized for reversible attachment to the fuel system of at least one of the plurality of vehicles.

5. The universal surrogate fuel pump system for interim fuel delivery to an internal combustion engine at one of a plurality of predetermined pressures of claim 2, wherein the fitting comprises a shut off valve.

6. A universal surrogate fuel pump system for interim fuel delivery to a fuel system of an internal combustion engine at one of a plurality of predetermined discharge pressures comprising:
   a. a portable fuel container;
   b. a fuel pump operably connected to receive fuel from the portable fuel container,
      said fuel pump being electrically powered and having means for receiving electrical power; and
   c. means for selectably adjusting the outlet fuel pressure for generating a plurality of specific discharge pressures, each of which fulfills a distinct fuel pressure requirement of the at least one of a plurality of internal combustion engines comprising one of:
      (1) a selectably adjustable outlet fuel pressure regulator operably connected to receive fuel from the fuel pump,
      (2) said fuel pump having a variable head discharge capability which is suitably programed,
      (3) a manually adjustable outlet fuel pressure regulator operably connected to receive fuel from the fuel pump and means for determining the outlet fuel pressure, and
      (4) an outlet fuel line having an inlet end operably connected to the fuel pump and a plurality of outlet ends, each of the plurality of outlet ends having a fitting for reversible attachment to the fuel system of at least one of a plurality of internal combustion engines, each said fitting having a distinctive flow restrictor and a normally closed valve that is opened upon attachment, whereby, said fuel pump system can be employed to deliver fuel at one of the plurality of predetermined discharge pressures to the fuel system of an internal combustion engine of any one of a plurality of vehicles satisfying a distinct fuel pressure requirement of one of said plurality of vehicles.

* * * * *